Dec. 22, 1959    J. B. HENNION    2,918,294
TELESCOPING SHOPPING CART; CHECKOUT SIGNAL
Filed Nov. 18, 1957    2 Sheets-Sheet 1
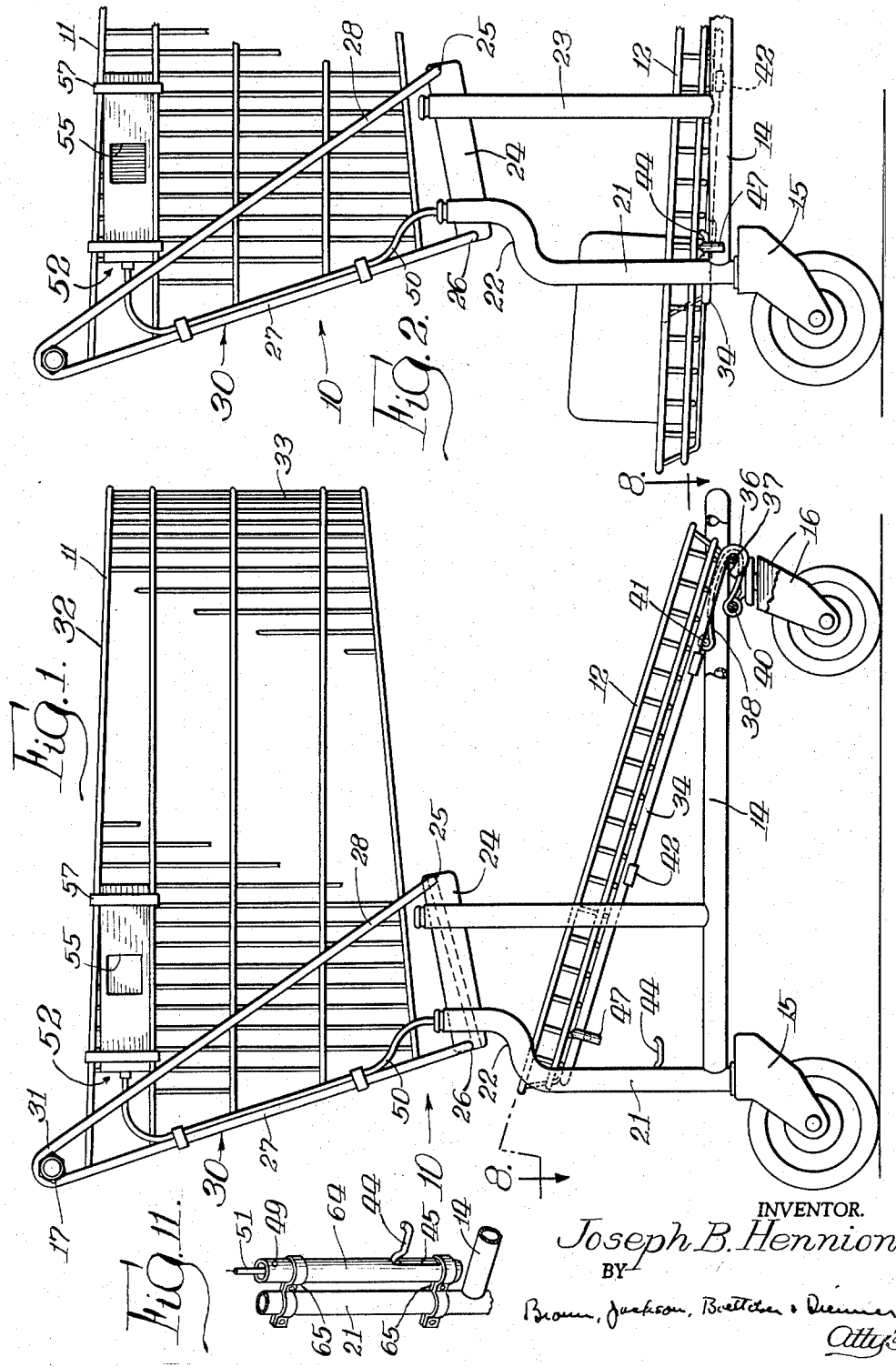
INVENTOR.
Joseph B. Hennion,
BY
Brown, Jackson, Boettcher & Dienner
Attys.

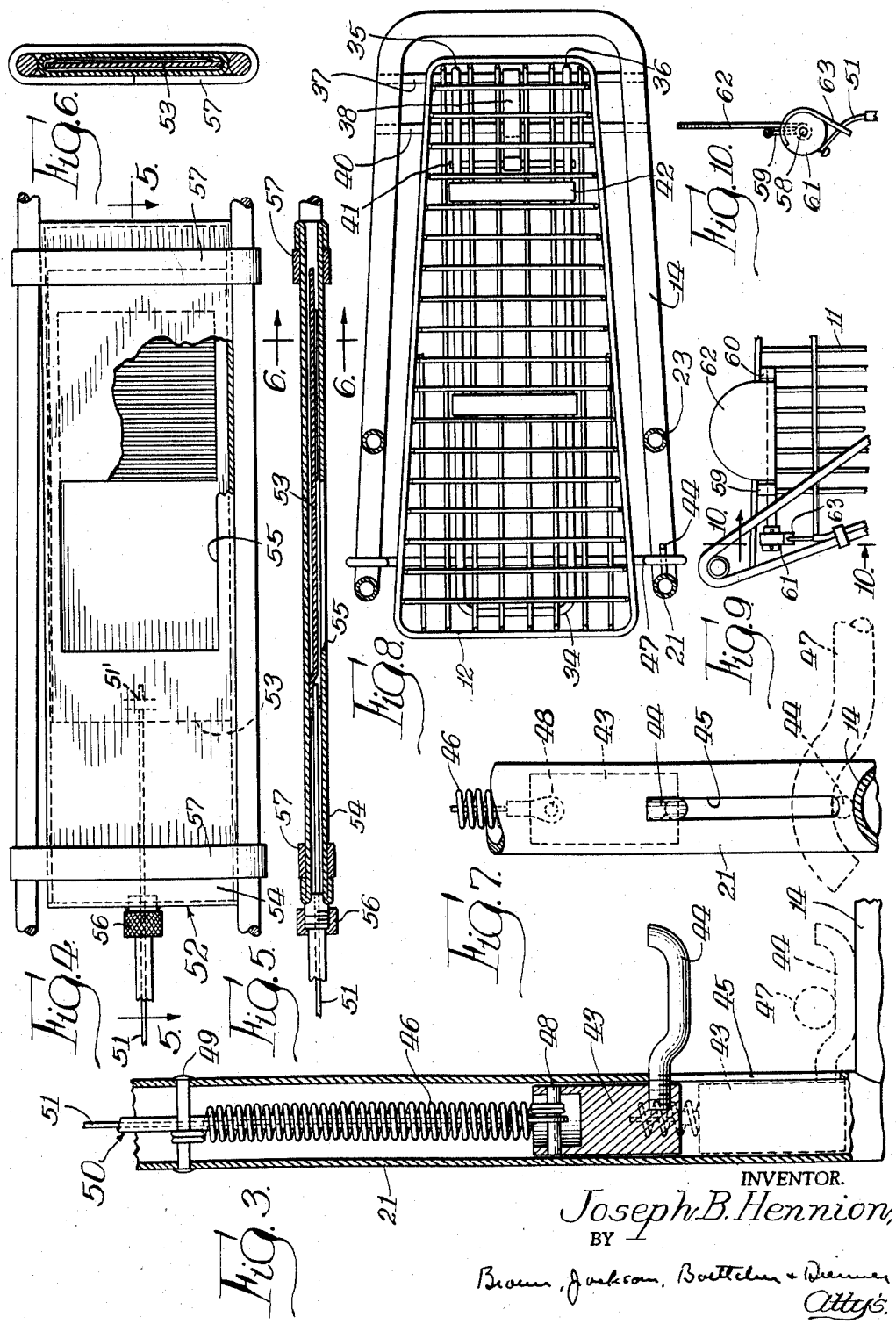

United States Patent Office 2,918,294
Patented Dec. 22, 1959

2,918,294

TELESCOPING SHOPPING CART; CHECKOUT SIGNAL

Joseph B. Hennion, Niles, Mich., assignor to Tyler Refrigeration Corporation, Niles, Mich., a corporation of Michigan Application November 18, 1957, Serial No. 697,136

13 Claims. (Cl. 280—33.99)

This invention relates, in general, to improvements in shopping carts of the telescoping type having an upper and lower basket or tray for handling merchandise and the like, and relates in particular, to a means of indicating that the lower tray or basket is loaded with merchandise.

Known shopping carts incorporate a wheeled main frame supporting a stationary upper basket and a lower tray or basket and arranged so that the frame and upper and lower basket may be telescoped with like elements of similar carts. Such known carts usually include an arrangement whereby the lower tray or basket is normally disposed—when free of merchandise, packages and the like—forwardly inclined or tilted for telescopic association with a like part on another cart. To accomplish the inclined disposition of the lower tray or basket, it is supported on a carriage arrangement, pivotally mounted on the front of the frame of the cart, and urged in the inclined forward relationship by a spring whereby when merchandise is placed in the lower basket or tray, the weight of the merchandise overcomes the spring and disposes the tray or basket and its carriage horizontally. A further improvement on such lower baskets or trays includes the slidability and removability of the basket from the frame when convenient.

Examples of such existing or known devices are shown and claimed, for example, in my co-pending patent application, Serial No. 618,075, entitled, "Telescoping Shopping Cart Having Movable Lower Package Support," filed October 24, 1956, now Patent No. 2,903,269, issued September 8, 1959, to which reference is hereby made for a full disclosure of such devices.

My present invention, being intended for use with such existing devices as disclosed in my co-pending patent application, above-identified, contemplates a means whereby notification is given when merchandise is on such lower tray or basket so that when such carts are positioned in a conventional manner adjacent a check-out counter, as for example, in present type food markets, any merchandise in such lower trays will not be overlooked and not charged out by the cashier.

Accordingly, it is a primary object of my present invention to provide an improved shopping cart having an indicating means or check out signal device for indicating that merchandise has been placed on the lower tray or basket.

Briefly, my invention contemplates in a shopping cart having a tiltable or inclined lower tray, a signal or indicating means comprising a slide means or a flag means connected to such lower tray so as to be actuated by movement thereof so that the signal or indicating means will draw attention to the fact that merchandise is in the lower tray or basket. In the embodiment disclosed, the actuating means for the check out signal means comprises a Bowden wire attached at one end to the signal device and at its other end to the lower tray carriage whereby movement of the carriage between its horizontal or tilted positions will actuate the signal device.

Accordingly, still another object of my invention is the provision of a signal actuating means in a cart so constructed and arranged to cooperate with the lower tray or basket to operate a signal indicating that merchandise is disposed on said tray.

Other and more particular objects of my invention will be apparent to those skilled in the art from the following description and drawings forming a part hereof and wherein:

Fig. 1 is an elevational view partially broken away illustrating to advantage my check out signal means typically installed in a shopping cart with the lower tray or basket in its tilted, unloaded position;

Fig. 2 is an elevational view showing a portion of the shopping cart with its lower tray in the horizontal position and loaded with merchandise;

Fig. 3 is an enlarged elevational sectional view illustrating to advantage the inner construction of part of the signal means;

Fig. 4 is an enlarged elevational view of the signal indicating means illustrated in Figs. 1 and 2;

Fig. 5 is a longitudinal cross-sectional view of the signal means shown in Fig. 4 taken along line 5—5 and looking in the direction of the arrows;

Fig. 6 is a cross-sectional view of the signal means illustrated in Figs. 4 and 5, taken along line 6—6 of Fig. 5 and looking in the direction of the arrows;

Fig. 7 is a side view of part of the signal means as shown in Fig. 3;

Fig. 8 is a plan view of the lower basket of the shopping cart shown in Figs. 1 and 2 taken along line 8—8 of Fig. 1 and looking in the direction of the arrows;

Fig. 9 is a partial elevational view of another embodiment of the signal means;

Fig. 10 is a cross-sectional view of the signal means shown in Fig. 9 taken along line 10—10 of Fig. 9 and looking in the direction of the arrows; and Fig. 11 is another embodiment of one portion of my check out signal means whereby my signal means may be adapted for existing carts.

Turning now to the drawings, and in particular to Figs. 1, 2 and 8 thereof, it can be seen that my shopping cart, indicated in its entirety as 10, comprises an upper basket 11, a lower basket or tray 12 and a tubular frame member 14, all of which are substantially U-shaped, as illustrated in Fig. 8, to permit the internestability or telescoping relationship with similar parts of like carts. The lower frame 14 has a pair of rear wheels 15 suitably affixed thereto, and a pair of caster front wheels 16 to permit the transportation of the cart by means of the handle 17.

Thus, it can be seen that in the arrangement in my cart of a U-shaped frame substantially open at the rear, and with the lower basket 12 being inclined or tilted towards the front and with the back or rear wall (not shown) of the upper basket 11 being mounted for tilting forwardly or inwardly and upwardly, that internesting or telescoping relationship with like parts of similar carts is afforded.

Turning now in more detail to my cart, it can be seen that the lower frame 14 is provided at its open end, (the extreme left as shown in Figs. 1 and 8 of the drawings) with a pair of hollow vertical members 21, each of which is formed with a reverse S portion 22 as shown in the drawings. A pair of vertical hollow tubular members 23 are suitably affixed to the intermediate portions of the U-shaped frame 14 and to which is attached at each upper portion thereof, substantially horizontally, and connecting with the upper portion of the adjacent vertical members 21, a relatively thin, relatively flat plate 24 (one shown).

Each plate 24 is notched as at 25 and 26 at the extreme ends to receive a pair of wires or rods 27 and 28 which are the legs of a triangular shaped handle holding bracket 30 suitably formed to fit into the notches 25 and 26 at the lower end of the leg members 27 and 28 with the handle 17 fixedly received in the apex of the triangle, as indicated at 31. These triangular bracket members 30 form part of and support the upper basket 11; the leg 27 forming a corner of the basket to which is attached the plurality of U-shaped horizontal wire frame members indicated in their entirety as 32 to form a support for the vertically extending wire members, indicated in their entirety as 33. The aforedescribed brackets 30 and associated components and basket 11 may be considered as constituting an upper fixed frame means for the shopping cart.

The inclined lower basket or tray 12 is supported on a U-shaped tubular frame or carriage, indicated in its entirety as 34, which open towards the front and is suitably hinged to the U-shaped frame 14 by the provision of curved ends 35, 36 around a cross bar 37 affixed to the frame 14 to permit the rear portion of the lower basket 12 to assume the inclined position as shown in Fig. 1 or the horizontal position as shown in Fig. 2. A leaf-type spring member 38 having one end affixed to a cross bar 40 affixed to the frame 14 and the other end affixed to a cross bar member 41 on the U-shaped carriage 34, is suitably biased to cause the U-shaped carriage 34 to be normally in its tilted position as shown in Fig. 1, yet sufficiently weak to permit the lower basket 12 to assume a horizontal position under a slight load. Means 42, which attach the basket 12 to the U-shaped frame 34, will permit the basket 12 to slide rearwardly and outwardly from the cart, if desired.

As hereinbefore mentioned, an important feature of my invention is the provision of a check out signal means or indicating means which will indicate to an observer, such as a cashier, that the lower tray or basket 12 is loaded with merchandise. To accomplish this function, I have provided actuating means comprising a member 43 slidable within one of the vertical members 21 (see Figs. 3 and 7) to which is fixedly connected to be movable therewith hook-like means 44 outwardly extending through a slot 45 in the tubular member 21. A corresponding hook 47 is permanently attached to the carriage 34 for basket 12 and arranged to engage the hook 44 to lower the slidable means 43 when the carriage 34 is lowered. A coil spring 46 suitably affixed at one end to slidable member 43 as by pin 48 and at its other end to the vertical member 21 as by pin 49 will bias the slidable member to its upper position. The slidable member 43 is further provided with a Bowden wire, indicated in its entirety as 50, the cable 51 of which is connected at one end to the slidable member 43 and at the other end to a check out signal or indicating means, indicated in its entirety as 52. In one embodiment as shown in Figs. 1 and 2 (and shown enlarged in Figs. 4, 5 and 6), the signal or indicating means 52 comprises plate member 53 attached to one end to the cable 51 of the Bowden wire 50 in any suitable manner as by forming a slot 51' to be received over the end of the cable as indicated, or by soldering and the like. Slidable plate 53 is slidably received in a relatively thin, relatively flat, rectangular, hollow container 54 and which is longer than the plate 53 to permit the full movement of the plate from one position to the other. A rectangular aperture 55 intermediate the ends of the plate container 54 forms a window for a portion of the slidable plate 53. Thus, when the tray or basket 12 is in its lower or horizontal position, the plate 53 serving as indicating means will be moved by the sliding means 43 and the Bowden wire to the left as shown in the drawings, whereby a portion of the plate 53, being painted any suitable color, such as red, will indicate the lowered position of the tray 12. (See Figs. 1 and 2.) The left end of the container 54 is provided with a suitable sleeve-like means 56 affixed thereto for easy operation of the Bowden wire and suitable sleeve clamps 57 affix the entire signal means to the upper basket 11 of the upper fixed frame means of the cart.

In another embodiment, as disclosed in Figs. 9 and 10, my indicating means comprises an elongated rod member 58 rotatably attached to the top of the upper basket 11 by means of two brackets 59 and 60 which are formed in a sleeve-like manner to receive the rod 58. At one end of the rod 58, there is provided actuating means comprising a pulley member 61 non-rotatably affixed to the rod 58 and suitably attached to the end of the Bowden wire 50 so that movement of the cable 51 thereof will cause the pulley member 61 to rotate, thus rotating a suitably colored flag member 62 upwardly as a signal indicating means, (as illustrated in Fig. 9). A suitable curved apertured cable guide member 63 may be provided to guide the cable about the pulley 61 and in this embodiment, as well as the other embodiment disclosed herein, the spring 46 will return the signal device to its original position when the tray 12 is free of merchandise.

In another form of my check out signal means, attention is invited to Fig. 11 wherein there is shown actuating means comprising the hook means 44 with slidable means 43 and cooperating spring means 46 enclosed in a separate elongated hollow container 64 and attached to the upright tubular frame member 21 by any suitable means such as brackets or clamps 65. In this arrangement, either of my check out signal means, as shown in Figs. 1–6 or in Figs. 9 and 10, may be attached to existing carts having a tiltable tray and actuated by the cable 51 of the arrangement in the container 64 when attached to each cart. In this figure, I have identified parts having the same function in this arrangement as like parts in the other arrangement disclosed in the other figures for purposes of illustration, it being noted, however, that cable 51 need not be disposed within upright member 21 as shown in Figs. 1–10.

Wherein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. In a shopping cart having upper fixed frame means including upper package supporting means, a lower tiltable package supporting means adapted when loaded to assume a horizontal position and when unloaded an inclined position, said frame means and said lower package supporting means being constructed and arranged to accommodate telescoping association with like carts, indicating means mounted on said upper frame means, and actuating means having connection with and extending from said indicating means and operatively connected with said lower package supporting means to actuate said indicating means to indicate when said lower package supporting means is in a horizontal position.

2. In a shopping cart having upper fixed frame means including upper package supporting means, a lower tiltable package supporting means adapted when loaded to assume a horizontal position and when unloaded an inclined position, said frame means and said lower package supporting means being constructed and arranged to accommodate telescoping association with like carts, indicating means mounted on said upper frame means, said indicating means comprising a holder having a window therein, flat plate means slidable in said holder relative to said window, said plate means having a part thereof identifiable as a signal, and actuating means having connection with and extending from said indicating means and operatively connected with said lower package supporting means to position said plate means disposing said signal at said window to indicate when said lower package supporting means is in a horizontal position.

3. In a shopping cart having upper fixed frame means including upper package supporting means, a lower tiltable package supporting means adapted when loaded to assume a horizontal position and when unloaded an inclined position, said frame means and said lower package supporting means being constructed and arranged to accommodate telescoping association with like carts, indicating means mounted on said upper frame means, actuating means having connection with and extending from said indicating means and operatively connected with said lower package supporting means to actuate said indicating means, and said indicating means defining a window and including means adapted to become visible or invisible in said window depending on the position of said lower package supporting means.

4. In a shopping cart having upper fixed frame means including upper package supporting means, a lower tiltable package supporting means adapted when loaded to assume a horizontal position and when unloaded an inclined position, said frame means and said lower package supporting means being constructed and arranged to accommodate telescoping association with like carts, indicating means mounted on said upper frame means, actuating means having connection with and extending from said indicating means and operatively connected with said lower package supporting means to actuate said indicating means, and said indicating means comprising a rotatable flag adapted to be alternately raised or lowered depending on the position of said lower package supporting means.

5. In a shopping cart having a frame, an upper package support carried by said frame, lower carriage means pivotally mounted at its forward end at the lower forward end of said frame, a lower package support, means for mounting said lower package support on said carriage, resilient means between said frame and said carriage for biasing the rearward end of said carriage upwardly thereby normally to dispose said lower package support at an inclination to accommodate telescopic association with like carts, the rearward end of said carriage being movable downwardly to facilitate loading of said lower package support and when loaded remaining in a horizontal position until unloaded, indicating means mounted at said upper package support, and actuating means having connection with and extending from said indicating means and operatively connected with said carriage to actuate said indicating means to indicate when a load is on said lower package supporting means.

6. In a shopping cart having a frame, an upper package support carried by said frame, a lower carriage means pivotally mounted at its forward end at the lower forward end of said frame, a lower package support, means for mounting said lower package support on said carriage, resilient means between said frame and said carriage for biasing the rearward end of said carriage upwardly thereby normally to dispose said lower package support at an inclination to accommodate telescopic association with like carts, the rearward end of said carriage being movable downwardly to faciliate loading of said lower package support and when loaded remaining in a horizontal position until unloaded, indicating means mounted at said upper package support including a movable member, and actuating means having connection with and extending from said movable member of said indicating means and operatively connected with said carriage to position said movable member of said indicating means to indicate when a load is on said lower package supporting means.

7. In a shopping cart having a frame, an upper package support, a lower carriage means pivotally mounted at its forward end at the lower forward end of said frame, a lower package support, means for mounting said lower package support on said carriage, resilient means between said frame and said carriage for biasing the rearward end of said carriage upwardly thereby normally to dispose said lower package support at an inclination to accommodate telescopic association with like carts, the rearward end of said carriage being movable downwardly to facilitate loading of said lower package support and when loaded remaining in a horizontal position until unloaded, indicating means mounted on said upper package support comprising signal means adapted to become visible or invisible, and actuating means having connection with and extending from said signal means of said indicating means and operatively connected with said carriage to render said signal means visible or invisible depending on the position of said carriage.

8. In a shopping cart having a frame, an upper package support, lower carriage means pivotally mounted at its forward end at the lower forward end of said frame, a lower package support, means for mounting said lower package support on said carriage, resilient means between said frame and said carriage for biasing the rearward end of said carriage upwardly thereby normally to dispose said lower package support at an inclination to accommodate telescopic association with like carts, the rearward end of said carriage being movable downwardly to facilitate loading of said lower package support and when loaded remaining in a horizontal position until unloaded, indicating means mounted on said upper package support comprising a window and signal means adapted alternately to become visible or invisible in said window, and actuating means having connection with and extending from said signal means of said indicating means and operatively connected with said carriage to render said signal means visible or invisible depending upon the position of said carriage.

9. In a shopping cart having a frame, an upper package support, a lower carriage means pivotally mounted at its forward end at the lower forward end of said frame, a lower package support, means for mounting said lower package support on said carriage, resilient means between said frame and said carriage for biasing the rearward end of said carriage upwardly thereby normally to dispose said lower package support at an inclination to accommodate telescopic association with like carts, the rearward end of said carriage being movable downwardly to facilitate loading of said lower package support and when loaded remaining in a horizontal position until unloaded, indicating means mounted on said upper package support comprising a rotatable flag means adapted to be alternately raised or lowered, and actuating means having connection with and extending from said rotatable flag means of said indicating means and operatively connected with said carriage to rotate said flag means to its raised or lowered positions depending upon the position of the carriage.

10. In a shopping cart of the type adapted for telescopic storage with like carts and having a frame, an upper load supporting means mounted on said frame, means including a supporting rack mounted on said frame, lower load supporting means supported by said rack, said rack being pivoted adjacent the lower forward end of the frame whereby the rearward portion of said rack and said lower load supporting means are moved downwardly to a substantially horizontal position when said lower load supporting means is loaded, the improvement comprising check-out signal means comprising indicating means mounted at the upper end portion of said frame, and actuating means having connection with and extending from said indicating means and operatively connected with said lower load supporting means to actuate said indicating means to indicate when a load has been placed upon said lower load supporting means.

11. In a shopping cart of the type adapted for telescopic storage with like carts and having a frame, an upper load supporting means mounted on said frame, means including a supporting rack mounted on said frame, lower load supporting means supported by said rack, said rack being pivoted adjacent the lower forward end of the frame whereby the rearward portion of said rack and said lower load supporting means are moved downwardly to a substantially horizontal position when said lower load supporting means is loaded, the improvement comprising a check-out signal means comprising indicating means mounted at the upper end portion of said frame and including a movable member, and actuating means having connection with and extending from said movable member of said indicating means and operatively connected with said lower load supporting means to position said movable member of said indicating means to indicate when a load has been placed upon said lower load supporting means.

12. In a shopping cart of the type adapted for telescopic storage with like carts and having a frame, an upper load supporting means mounted on said frame, means including a supporting rack mounted on said frame, lower load supporting means supported by said rack, said rack being pivoted adjacent the lower forward end of the frame whereby the rearward portion of said rack and said lower load means are moved downwardly to a substantially horizontal position when said lower load supporting means is loaded, the improvement comprising a check-out signal means comprising indicating means mounted at the upper end portion of said frame comprising a window and signal means adapted to become visible and invisible in said window, and actuating means having connection with and extending from said signal means of said indicating means and operatively connected with said lower package supporting means to position said signal means in visible and invisible positions depending upon the position of said rack and said lower load supporting means.

13. In a shopping cart of the type adapted for telescopic storage with like carts and having a frame, an upper load supporting means mounted on said frame, means including a supporting rack mounted on said frame, lower load supporting means supported by said rack, said rack being pivoted adjacent the lower forward end of the frame whereby the rearward portion of said rack and said lower load supporting means will move downwardly to a substantially horizontal position when said lower load supporting means is loaded, the improvement comprising check-out signal means comprising indicating means mounted at the upper end of said frame, said indicating means including a rotatable flag means adapted to be alternatively raised or lowered, and actuating means having connection with and extending from said rotatable flag means of said indicating means and operatively connected with said carriage means to rotate said flag means to its raised or lowered positions depending upon the position of said carriage.

References Cited in the file of this patent

UNITED STATES PATENTS

| | | |
|---|---|---|
| 616,055 | Eaton | Dec. 13, 1898 |
| 1,762,384 | Bow | June 10, 1930 |
| 2,479,530 | Watson | Aug. 16, 1949 |
| 2,590,048 | Sides | Mar. 18, 1952 |
| 2,687,589 | Brockway | Aug. 31, 1954 |
| 2,738,201 | Spears | Mar. 13, 1956 |
| 2,812,187 | Nicholl et al. | Nov. 5, 1957 |